United States Patent [19]
White

[11] Patent Number: 5,864,781
[45] Date of Patent: Jan. 26, 1999

[54] COMMUNICATION BETWEEN COMPONENTS OF A MACHINE

[75] Inventor: James F. White, Winnipeg, Canada

[73] Assignee: Vansco Electronics Ltd., Winnipeg, Canada

[21] Appl. No.: 772,990

[22] Filed: Jan. 6, 1997

Related U.S. Application Data

[63] Continuation of Ser. No. 380,006, Jan. 27, 1995, abandoned.

[51] Int. Cl.$^6$ .................................................. G01B 21/00
[52] U.S. Cl. .......................... 702/182; 702/127; 364/130
[58] Field of Search .............................. 364/550, 551.01, 364/554, 130, 172; 340/438, 439; 701/35, 102; 702/128, 127, 179, 182, 183, 184; 111/199; 395/280, 287, 306, 309, 821, 835; 370/257, 449

[56] References Cited

U.S. PATENT DOCUMENTS

| | | |
|---|---|---|
| 3,527,928 | 9/1970 | Ryder et al. . |
| 3,537,091 | 10/1970 | Schenkenberg . |
| 3,723,989 | 3/1973 | Fathauer et al. . |
| 3,921,159 | 11/1975 | Steffen . |
| 3,927,400 | 12/1975 | Krepler . |
| 3,974,377 | 8/1976 | Steffen . |
| 4,009,799 | 3/1977 | Fathauer . |
| 4,054,779 | 10/1977 | Wilke . |
| 4,056,817 | 11/1977 | Bachman . |
| 4,064,455 | 12/1977 | Hopkins et al. ........................ 364/554 |
| 4,068,223 | 1/1978 | Steffen . |
| 4,085,862 | 4/1978 | Steffen . |
| 4,137,529 | 1/1979 | Anson et al. . |
| 4,149,163 | 4/1979 | Fathauer . |
| 4,157,468 | 6/1979 | Primiano . |
| 4,159,064 | 6/1979 | Hood . |
| 4,163,507 | 8/1979 | Bell . |
| 4,166,948 | 9/1979 | Steffen . |
| 4,225,930 | 9/1980 | Steffen . |
| 4,268,825 | 5/1981 | Kaplan . |
| 4,277,833 | 7/1981 | Steffen . |
| 4,307,390 | 12/1981 | Steffen et al. . |
| 4,333,096 | 6/1982 | Jenkins et al. . |
| 4,369,895 | 1/1983 | McCarty et al. . |
| 4,491,241 | 1/1985 | Knepler et al. . |
| 4,555,624 | 11/1985 | Steffen . |

(List continued on next page.)

OTHER PUBLICATIONS

Technical Paper —Bosch —CAN "The breakthrough for the networking of electronics in the vehicle" (15 pages) date not known.
Technical Paper —"Class B Data Communication Network Interface"–SAE J1850–Aug. 1991 (17 pages) date not known.
Technical Paper —"Serial Data Communications Between Microcomputer System in Heavy Duty Vehicle Applications —SAE J1708 Oct. 1990" (4 pages) date not known.
Technical Paper —"Joint SAE/TMC Electronic Data Interchange Between Microcomputer Systems in Heavy–Duty Vehicle Applications —SAE J1587 Nov. 1990" (8 pages) date not known.

*Primary Examiner*—John Barlow
*Assistant Examiner*—Patrick Assouad
*Attorney, Agent, or Firm*—Adrian D. Battison; Murray E. Thrift

[57] ABSTRACT

A system for monitoring and/or controlling operation of a machine is particularly designed for agricultural machines such as seeders or planters. The system includes a central monitor unit and a plurality of sensors all connected in series on a communication bus. Each sensor is manufactured with a unique ID code. The central monitor unit on installation of the system polls each sensor as it is installed in a particular order of installation determined by the central monitor so that central monitor knows the location, function of each sensor in conjunction with its ID code. The central monitor then controls polling of the sensors by commands addressed to the individual sensors. Each sensor has a processor, transducer and a memory for storing data arising from the transducer. The memory can comprise a rollover memory of a simple nature which counts pulses or clock pulses and transmits the stored data when polled by the central monitor.

21 Claims, 3 Drawing Sheets

U.S. PATENT DOCUMENTS

| | | |
|---|---|---|
| 4,634,855 | 1/1987 | Friend et al. . |
| 4,635,215 | 1/1987 | Friend . |
| 4,924,418 | 5/1990 | Bachman et al. . |
| 5,107,425 | 4/1992 | Donges et al. ............... 364/424.03 |
| 5,189,617 | 2/1993 | Shiraishi ...................... 364/424.01 |
| 5,224,124 | 6/1993 | Hamano et al. ............... 364/424.01 |
| 5,369,581 | 11/1994 | Ohsuga et al. ............... 364/424.04 |
| 5,418,720 | 5/1995 | Randel ........................ 364/424.03 |
| 5,444,626 | 8/1995 | Schenk ........................ 364/431.04 |
| 5,450,321 | 9/1995 | Crane .......................... 364/424.04 |
| 5,453,939 | 9/1995 | Hoffman et al. ............. 364/551.01 |
| 5,467,272 | 11/1995 | Yoshida et al. .............. 364/424.03 |
| 5,483,230 | 1/1996 | Mueller ....................... 340/825.06 |
| 5,488,817 | 2/1996 | Paquet et al. ................. 56/10.2 R |
| 5,491,631 | 2/1996 | Shirane et al. ............... 364/424.04 |
| 5,499,182 | 3/1996 | Ousborne ..................... 364/424.04 |
| 5,600,558 | 2/1997 | Mearek et al. ............... 364/424.04 |
| 5,635,911 | 6/1997 | Landers et al. . |
| 5,642,284 | 6/1997 | Parupalli et al. ............. 364/424.035 |
| 5,657,224 | 8/1997 | Lonn et al. ................... 364/424.034 |
| 5,710,723 | 1/1998 | Hoth et al. ................... 364/551.01 |
| 5,748,923 | 5/1998 | Eitrich ......................... 395/309 |
| 5,757,672 | 5/1998 | Hoepken ...................... 364/551.01 |

5,864,781

COMMUNICATION BETWEEN COMPONENTS OF A MACHINE

This application is a continuation of application Ser. No. 08/380,006, filed Jan. 27, 1995 and now abandoned.

BACKGROUND OF THE INVENTION

This invention relates to a method for communication between components of a machine which can be used for monitoring operation of a machine and/or for actuating or controlling various aspects of the machine. The invention is particularly but not exclusively designed for use with agricultural machines such as seeders, planters and the like.

Devices for monitoring seeders, planters and the like have previously been proposed, and generally these include sensors or transducers at various locations on the device for detecting various parameters of the operation of the machine. Thus one well known requirement for a sensor is that of detecting seed flow or seed movement. In an air seeder it is often desirable to detect the flow of seeds in an air tube to provide an indication of the rate of flow which can be also used to detect a blockage or zero flow. Further sensors have been provided for detecting the rate of rotation of shafts of the machine either for detecting seed supply rate or for detecting other parameters such as ground speed as detected by rotation of an axle. Yet further sensors have been provided for detecting a level of filling of a supply tank.

Generally the detection apparatus includes a central control unit with a key pad for allowing manual data entry, a display for providing information to the operator and a communication system for communication between the central control unit and the individual sensors. Generally devices of this type have used sensors which are simply switches or transducers which therefore provide a simple detection of a parameter to be detected and transmit a signal to the central control unit on detection of the parameter. Thus the conventional sensor does not include any memory or logic control so that the information is not acted upon or stored at the sensor itself. Such sensors require direct communication from the sensor itself to the control unit thus requiring individual wiring from each sensor to the control unit.

As the monitoring devices of this type become more complex and require more parameters to be monitored, the complexity of such individual wiring arrangements significantly increases cost and installation complication.

In addition to the monitoring function the present invention can also be used in relation to combined monitoring and control functions and also in relation to communication protocols between elements of a control system which does not include any monitoring function.

SUMMARY OF THE INVENTION

It is one object of the present invention, therefore, to provide an improved method of communicating between components of a machine, which can be used for monitoring operation of a machine or for effecting control functions of the machine or a combination of those, which avoids individual wiring between each subsidiary or slave unit and the control or central unit.

According to one aspect of the invention there is provided a method of communicating between components of a machine comprising the steps of: providing a central unit having a visual display, manual input means, a monitor memory and a central processor; providing a plurality of subsidiary units each subsidiary unit having a transducer for cooperating with a part of the machine, a subsidiary memory and a subsidiary processor for controlling communication of information between the transducer and the subsidiary memory and for controlling getting of information from the subsidiary memory; providing a communication bus interconnecting the central unit and each of the subsidiary units; and causing the central unit to poll the subsidiary units one at a time on the communication bus for communicating information between the subsidiary memory of each subsidiary unit when polled and the central unit.

According to a second aspect of the invention there is provided a method of monitoring operation of a machine comprising providing a central monitor unit having a visual display, manual input means, a monitor memory and a monitor processor, providing a plurality of sensor units each sensor unit having a transducer for detecting information from a part of the machine to be monitored, a sensor memory and a sensor processor for controlling input of information from the transducer into the sensor memory and for controlling getting of information from the sensor memory, providing a communication bus interconnecting the central monitor unit and each of the sensors, and causing the sensor processor to poll the sensor units sequentially on the communication bus for getting information from the sensor memory of each sensor unit when polled.

Preferably the method includes storing in each sensor or subsidiary unit an ID code which is unique to that unit which is stored during manufacture of the unit and the central monitor unit polls each sensor unit for its ID code and stores in the monitor memory the ID code of each sensor unit together with information relating to the function and location of that sensor unit.

Preferably the method includes providing instructions to an operator for installation of sensor units in a particular order related to the location and function of the sensor unit and to poll each installed sensor unit after installation thereof to obtain information therefrom relating to the ID code of the sensor unit.

Preferably at least one of the sensor units is arranged for detection of a speed of rotation of a machine component to be monitored and includes switch means responsive to passage thereby of a switch element mounted on the component such that rotation of the component causes the switch element to repeatedly pass the switch means to actuate the switch means and wherein the sensor processor is arranged to input into the memory data related to the period of time between a last actuation of the switch element and a penultimate actuation of the switch means.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

The following description relates to a monitoring system but the present invention can also be used in a combined monitoring and actuating or control system or in a system which relates solely to communication from a central control unit to a plurality of slave control units.

Figure 1:
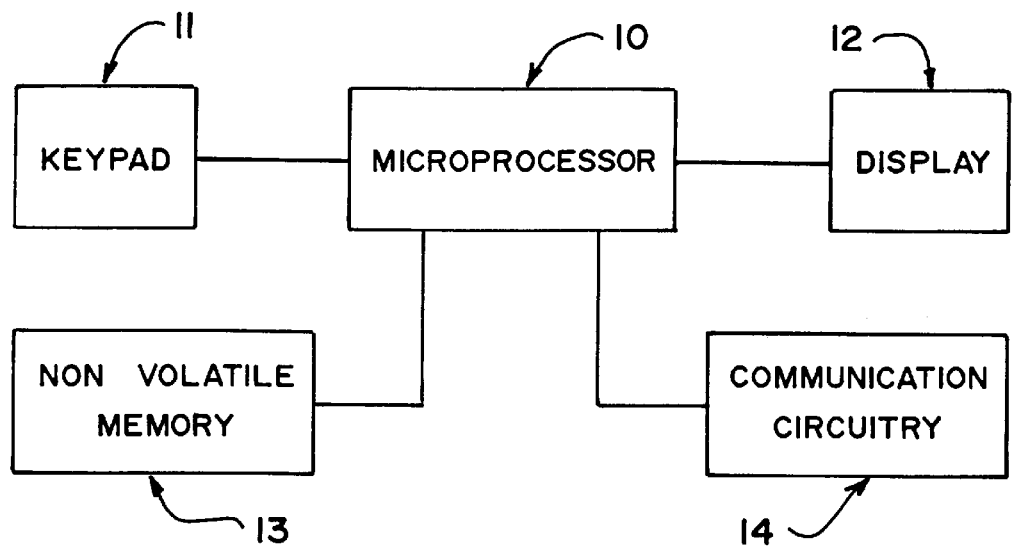
FIG. 1 is a block diagram showing the construction of the central monitor unit.

The construction of the central monitor unit is shown schematically in FIG. 1 and comprises a monitor microprocessor 10 which has connected thereto a manual input keypad 11, a display 12, a memory unit 13. The microprocessor also is connected to a communication interface 14 which is attached to the communication bus for connection to each of the sensors.

Figure 3:
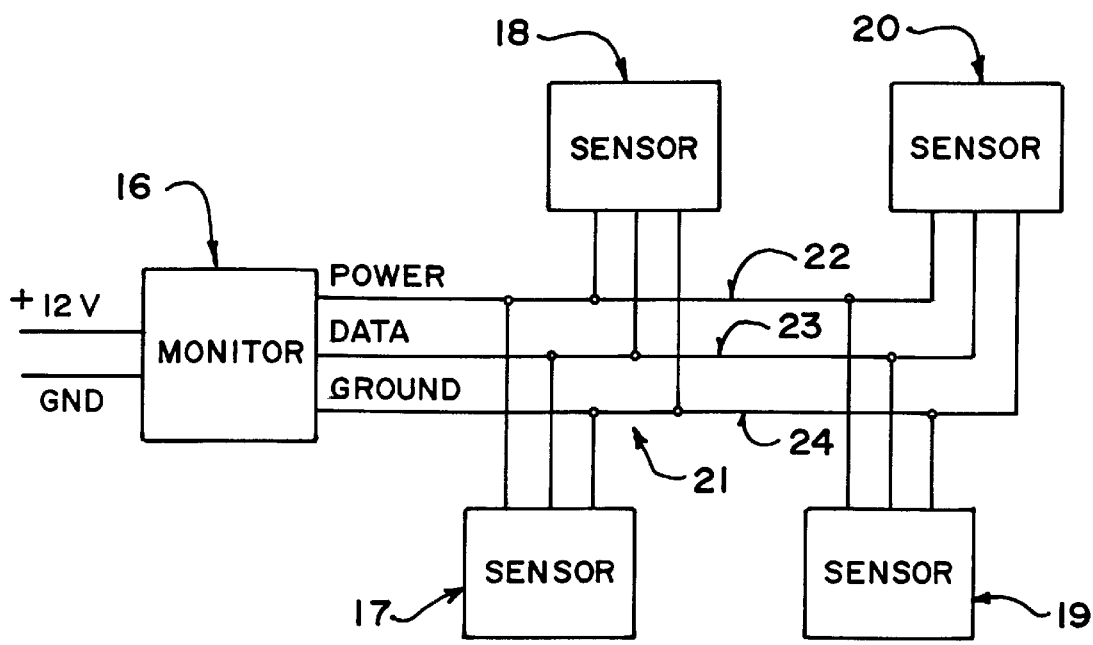
FIG. 3 is a block diagram of the whole system including the central monitor unit and the plurality of individual sensors.

Thus as shown in FIG. 3, the central monitor is generally indicated at 16 and is connected to each of the sensors individually indicated at 17, 18, 19, 20 etc. through a simple communication bus generally indicated at 21 which connects to each sensor in parallel. Thus the communication bus consists solely of three wires comprising a power wire 22, a data communication wire 23 and a ground return 24. As the sensors are each connected to the communication bus in parallel, it is necessary to provide a communication protocol between the monitor and each of the sensors to avoid the sensors communicating on the communication bus simultaneously.

Figure 2:
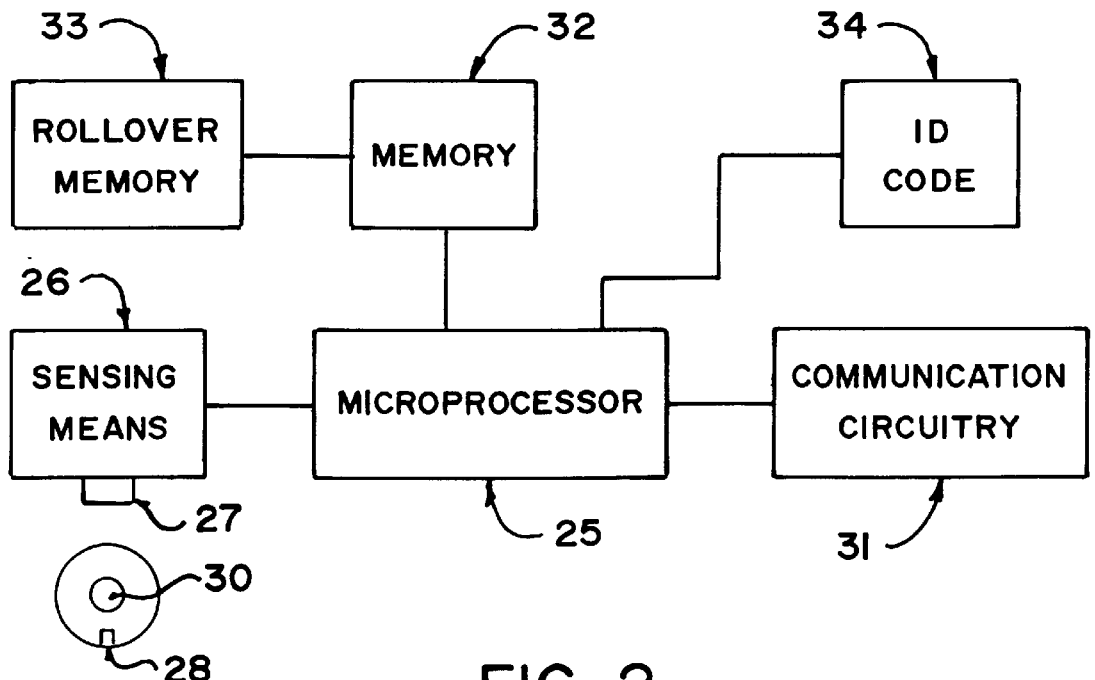
FIG. 2 is a block diagram showing the construction of each individual sensor element illustrating for example a sensor for detecting rotation of a shaft.

The construction of one sensor is shown in FIG. 2 and as one example the sensor for detecting rotation of a shaft is shown although of course other types of sensors are necessary as will be well known to one skilled in the art.

Thus the sensor comprises a sensor microprocessor 25 which connects to a sensing means or transducer 26 for detecting an event. In the example shown, the sensing means 26 carries a switch for detecting passage by the switch of a switch element 28 carried on a shaft 30. In one example the switch 27 can comprise a reed switch so that the switch element 28 comprises a magnet which actuates the reed switch each time the magnet passes by the reed switch 27. As an alternative, the switch 27 can comprise a variable reluctance sensor which monitors the output from a variable reluctance pickup determining the passage thereby of a piece of ferrous material constituting the element 28.

As previously explained, the shaft 30 can comprise one of many different shafts on a machine sensing engine speed or ground speed or other rates of rotation of a shaft for effecting various functions.

The sensor further includes a communication interface 31 connected to the microprocessor 35 with the interface 31 connecting to the communication bus 21. The microprocessor 35 further includes access to information stored in a first memory 32 which includes as a subset of that memory a counter 33. The microprocessor further has access to a unique ID code stored in a memory element 34. The memory element 34 is of a type which allows a unique ID code to be embedded in the sensor during manufacture. The manufacturing process can therefore ensure that each sensor has a unique code different from the code embedded in any other sensors manufactured so that there is no practical possibility of an overlap between the codes of the sensors.

The ID code is inserted in the one-time programmable memory at the time the microprocessor is initially programmed. The programmer is set up in such a way as to put into each sensor in turn at a certain memory location in that sensor a number which is increasing for each subsequent sensor manufactured. The ID number consists of a sixteen bit serial number and a four bit type code that is hard wired to the microprocessor. Procedures in production ensure that sensors will not be programmed with the same code. Naturally, when all the ID codes for a given sensor type have been used, the codes will be repeated. However it is very unlikely that two sensors with the same code will be used on a particular machine so that problems from duplication will be avoided. The communication protocol between the central monitor unit and the sensors is as follows:

1.0 Overview

This protocol is intended to connect one master (the MONITOR) and up to 250 slaves (SENSORS or ACTUATORS) on a half duplex link. In the real world, the number of attached slaves is limited by the hardware implementation to 40. The communication is done using a standard SCI port working at 2400 bd, 1 stop bit, 8 data bits, lsb first. Values greater than 255 will be send LSB first.

All slaves shall have an unique 16 bit serial number pre-programmed in rom and a 4 bit hard-wired number to define its TYPE. The TYPE number is used to define 16 partitions or slave types. These 2 numbers are available on request.

The serial number and the TYPE number are used to define an equivalent address space of $2^{**}20$ known as slave's PHYSICAL ADDRESS.

To speed-up the communication, the usage of the Physical Address is limited to only a few, seldom used frames as qualifying data. To replace it, the monitor will allocate each sensor in the present configuration an unique 1 byte number known as LOGICAL ADDRESS. This process will take place on each power-up and then, as often as necessary.

The monitor will have to learn new slaves, name them, and detect and rename malfunctioning slaves.

The 1 byte LOGICAL ADDRESS defines an addressing space from 0 to 255. Addresses from 1 to 250 will specify one slave only. Address 0 shall be the DEFAULT_ADDRESS (assumed by the slaves on "power-up" or "ram_corrupted" conditions). The codes from 251 to 255 are invalid addresses and they are used as special formatting codes.

The link is based on FRAMES, each frame being started by the master with a COMMAND MESSAGE.

A Command Message may be GLOBAL, and will target all sensors, or DIRECT-ed to a sensor only. The Default_Address is used to define a global command. In general, it is not possible to get the slave(s) to ACKnowledge on a global command and is recommended to send the same frame several times to improve reliability.

Using the Default Address the monitor will:
  see new, just attached slaves during installation time (only ONE new slave of the same type can be connected at any time)
  allocate a logical address to each known slave after power-up, in which case the address 0 will be further qualified by the unique 16 bit serial number and 4 bit TYPE number, both "programmed" in each slave's rom during mfg.
  broadcast global commands which will instruct all the slaves to execute same specified action.

The FRAME_END depends on the type of command message issued. In general, the sensor will send back some data bytes and/or a checksum to ok the transaction. There will be no reply if the addressed slave is not in the current configuration, or the Command Message is not verified by its checksum(s) at slave's end, or the Command Message tells the slave a reply is not expected. If the sensor's reply is expected, but not seen, the monitor will retry a few times before flagging the error to the user.

2.0 Frame format

<SYNC><Command_Message><Slave_Reply>

All frames shall start with an unique SYNC character ($ff). To allow the transmission of the $ff data byte, SYNC will be translated to ($ff–>$ff|$fe, where $fe is the Translate code). That means the receiver will see the SYNC byte as "frame start" or "valid $ff if SYNC received" (if "frame start" then "drop $ff and keep next" else "keep $ff, check next").

NOTE: The SYNC code will also keep the sensor from resetting. As long a SYNC code is regularly received at intervals shorter then 1 second, the sensors will clear their sanity timer. If SYNC is delayed for a longer time, the sensors will reset and will set all the parameters to their default values. One important consequence will be the sensor "name" will change to the DEFAULT_ADDRESS, and thus the sensor will only respond to global frames and must be re-initialized.

2.1 Command Message

The Command Message format is:

<ADDRESS><COMMAND><OFFSET><SIZE><checksum1><FUNCTION>DATA<checksum2> where <FUNCTION><DATA><checksum2>fields are optional.

The ADDRESS (8 bits) is the slave's name (or its allocated logical address). If the Command_Message is global it will use the Default_Address (0). When a global frame is broadcasted all slaves shall load the command and execute it.

If the received ADDRESS is in the range from 1 to 250 the slave will check it against its name and if different, will ignore the remainder of the frame. If there is a match between the received address and slave's name, the slave will continue loading the frame. As mentioned above the codes from 251 to 255 are reserved and cannot be used as address identifiers.

The COMMAND field (1 bit) sets the frame type. There are 2 frame types available:

GET=1, asks the slave to send back some data from its COMMON memory.
PUT=0, asks the slave to write a small data block into its COMMON memory.

A small block of memory is reserved in each slave to define the COMMON block, which is available to the rest of the net. This approach will limit the interference between the net commands and the private memory on each slave. The length of the Common block may be different on different types of sensors. For Common table examples and more implementation details for various sensors see Appendix 1.

The OFFSET value (7 bits) is an index in the slave's Common table and SIZE (8 bits) is the number of bytes from that index to be up/downloaded. The FUNCTION field is used by PUT frames to further describe the request. All 256 combinations are available.

2.2 How will a slave react to an incoming Command Message?

All the slaves will see the address field. This address has to be either the DEFAULT_ADDRESS (0) or to match slave's logical address to keep the slave on line. If the slave decides to continue to listen, it will load the command, the offset, the size and will compute the checksum. If a match is found the sensor will send back the <checksum1> field which will validate this part of the Command_Message on the monitor side. Depending on the type of command, the slave may decide to execute it or continue to receive the remainder (<FUNCTION><DATA><CHECKSUM2>), check it again and execute or discard it.

2.3 Slave Reply

Is in the form:

<DATA><checksum> with <DATA> field being optional.

2.4 Conventions

<>=logic delimiter
,=bit delimiter
|=byte delimiter
[]=master to slave message delimiter
()=slave to master message delimiter
{}=frame delimiter
$=hex value
b"=binary value
Adr=the name of the slave or Default_Address (0)
chk1=checksum is the ADD of all previous bytes not including SYNC or Translate
chk2=checksum is the add.mod.8 of the Function and all Data bytes, not including Translate codes
chk3=checksum is the add.mod.8 of all slave's reply, not including Translate codes
SN#=slave's pre-programmed unique 16*b* Serial number (rom)
TYPe=slave's hard-wired type, see Appendix 3 for the TYPE definitions.

3.0 Frame Detailed Description

The two basic frames, GET and PUT are described here in greater detail, including the corresponding Slave_Reply message. Examples will be given with the structure of the entire frame.

3.1 PUT Frames

There are a few variations of the PUT frame, depending on the value of the Function byte:
WRITE=0
LEARN=1
WAKE-UP=2
The general format of a PUT frame is:

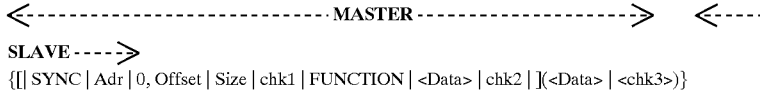

{[| SYNC | Adr | 0, Offset | Size | chk1 | FUNCTION | <Data> | chk2 |](<Data> | <chk3>)}

The slave will load Offset, Size and Size * bytes (Function+Data), then execute. None of the PUT functions will be allowed to write outside the COMMON block.

3.1.0 WRITE

Function code=$00

Write (SIZE-1) <DATA> from Buffer+1 to Common starting at OFFSET. The slave may echo back chk3=0 as ACK in direct mode.

May be used as a global command, but in that case no form of ACK is possible. A special form of WRITE GLOBAL is used to reset all slaves to default (former Sleep function) by writing 0 to Logical_Address location.

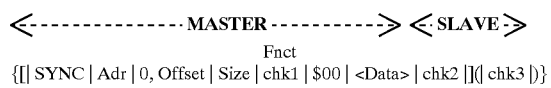
Fnct
{[| SYNC | Adr | 0, Offset | Size | chk1 | $00 | <Data> | chk2 |](chk3 |)} ex:

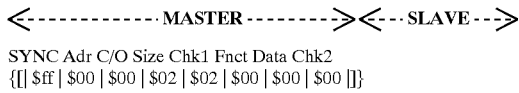
SYNC Adr C/O Size Chk1 Fnct Data Chk2
{[| $ff | $00 | $00 | $02 | $02 | $00 | $00 | $00 |]} is a global Sleep (Logical_Address=Default_Address=0). Note: No write bellow Common_End, no roll-over allowed; echo chk3=0 when possible. Although the frame sends out SIZE * bytes, one is used to specify the FUNCTION. Only SIZE-1 data byte are available per frame.

3.1.1 LEARN

Function code=$01

Is like a WRITE with SIZE=1 (no Data to write). Is used to learn slave's serial number and TYPE number. When it's broadcasted as a global command all slaves which still have Logical Address=0 (not named yet) will answer. It's very important to have only 1 new slave connected at any time. The master shall follow a Learn frame with a Wake-up frame and name the slave. As soon the master names the slave, the slave shall not answer to a global Learn any more.

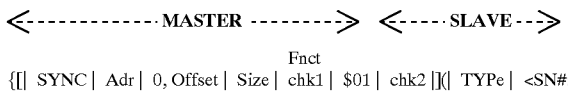
Fnct
{[| SYNC | Adr | 0, Offset | Size | chk1 | $01 | chk2 |]( TYPe | <SN#> | chk3 | )} ex:

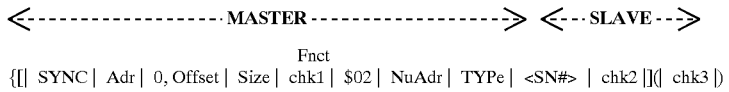
SYNC Adr C/O Size Chk1 Fnct Chk2 TYPe SN#LSB SN#MSB Chk3
{[| $ff | $00 | $00 | $01 | $01 | $01 | $01 |]( $00 | $10 | $34 | $44 |)} slave named $00 returns SN#=$3410, TYPe=$00.
Note: Offset n/u, set to 0; Size=1

3.1.2 WAKE-UP

Function code=$02

This frame will write the "name" (1 byte) to Logical_Address location. It is used to (re-)name the slave with a new address. There is no difference if the command is global or direct. The slave must first qualify by comparing the received serial number and TYPE number against its own pre-programmed numbers and on a match condition assume the new name.

```
<---------------- MASTER ----------------->  <--SLAVE-->
                         Fnct
{[| SYNC | Adr | 0, Offset | Size | chk1 | $02 | NuAdr | TYPe | <SN#> | chk2 |]( chk3 |)
``` ex:

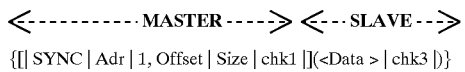
SYNC Adr C/O Size Chk1 Fnct NuAdr Data Chk2 Chk3

{[| $ff | $00 | $00 | $05 | $05 | $02 | $01 | $00 | $10 | $34 | $47 |]( $00 |)} slave serial number=$3410, TYPE $00 is named $01. The slave will ACK by returning chk3=0.
Note: Offset=0 (LA), Size=5, chk3=0

3.2 GETframes

Read SIZE * DATA starting at OFFSET. There is only 1 GET frame available: direct GET. A global GET, using the Logic_Address=Default_Address will not be answered by the slaves and is not used. A directed GET will return a DATA field of SIZE bytes starting at base+OFFSET. There are no restrictions on GET frames, any block of ram may be read.

```
<---------- MASTER ----->  <--SLAVE-->
{[| SYNC | Adr | 1, Offset | Size | chk1 |](<Data > | chk3 |)}
``` load OFFSET and SIZE then send back Size bytes from Common memory starting at address Offset.

ex:

```
<------MASTER-->    <---SLAVE-->
SYNC Adr C/O Size Chk1    Measurement

{[| $ff | $01 | $81 | $03 | $85 |]([ LSB | xx | MSB | chk3 |)}
``` slave named $01 returns the last 3 bytes of data.

Various types of sensors can be used in the monitoring device of the present invention. In one example of sensor, the sensor can monitor rotation of a shaft. This can be effected using the conventional reed switch which opens and closes due to an external magnet mounted on the shaft and passing by the fixed switch located adjacent the shaft. As an alternative to the reed switch, a variable reluctance sensor can be provided comprising a variable reluctance pickup which determines when a piece of ferrous material passes by the pickup. Again the pickup is located adjacent a rotating body with the ferrous material mounted on the rotating body as a switch element.

The shaft sensor can be used to detect various shaft rotations including for example ground speed sensor which detects rotation of an axle or other suitable rotating position on a ground wheel.

In a sensor of this type, the sensing means 26 therefore effectively generates an electrical pulse indicative of actuation of the switch. The microprocessor 25 is programmed to detect the period of time between each actuation or pulse and the next actuation or pulse. The microprocessor therefore places into memory data relating to the period of time between the last two actuation's and the time since the last actuation. This data is therefore stored in the memory and is communicated to the central monitor on a polling request in the protocol explained herein above. The monitor therefore receives the data and places this data in its memory. The monitor operates on the data so as to use the time between the last two actuations together with previously entered data concerning the number of actuation's per revolution to determine the rate of rotation of the shaft. The monitor uses the time since the last actuation to determine if the shaft has stopped. If this number becomes significantly larger than the time between the last two actuations, the monitor assumes the shaft has stopped. Also if the time period since the last actuation becomes larger than the time between the last two actuations, the monitor uses the time since the last actuation to calculate the shaft revolution rate. This allows the display to gradually change to the new rate and in the case of a completely stopped shaft, to gradually approach zero.

Figure 2A:
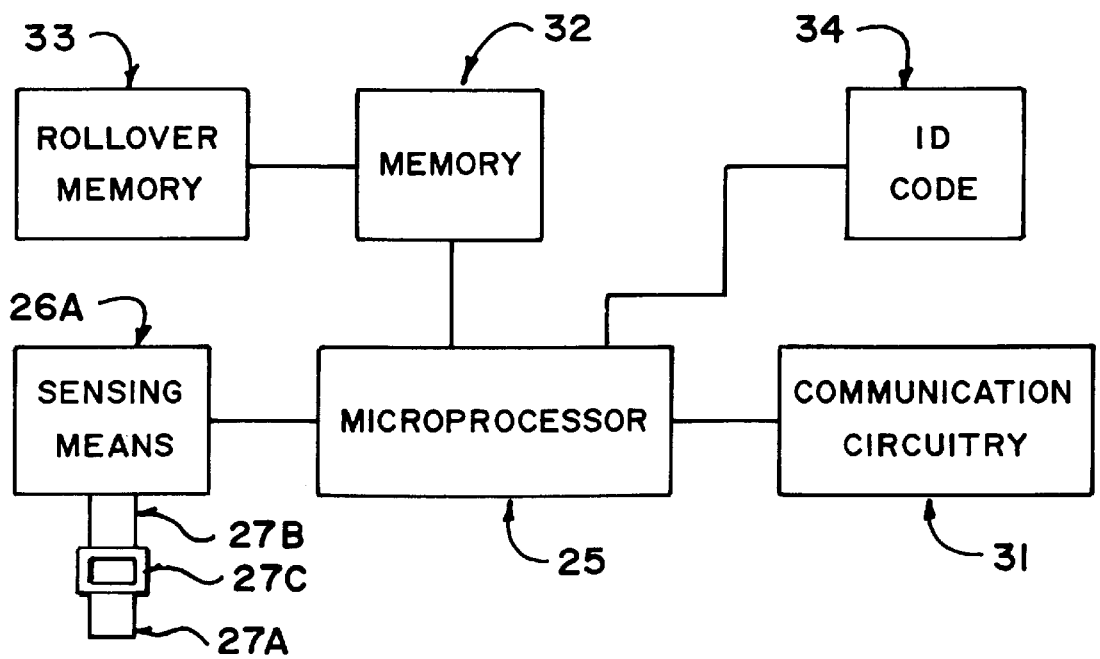
FIG. 2A is a block diagram identical to that of FIG. 2 except that it shows a sensor for detecting passage of seeds in a seed path.

An alternative form of sensor as shown in FIG. 2A comprises a seed counter sensor. The seed counter sensor uses an infra red light beam to detect the presence of a seed. When a seed is between the transmitter 27A and the receiver 27B, the light level is reduced and the sensor interprets this light reduction as the presence of a seed. There is a sensor located in each path of the seeder that is the discharge duct 27C from the seed counting mechanism so as to count all of the seeds as they are discharged through the duct to the ground. When the seeds are small, the sensor can no longer count all the individual seeds and instead gives a value which is proportional to the rate of flow of the seeds.

The seed counter sensor includes the rollover memory 33 so that each counted seed simply is monitored by the sensing means 26 to generate a pulse so that the pulse is then injected into the rollover memory which simply counts those pulses up to a predetermined maximum or rollover number.

When polled by the central monitor, the microprocessor of the respective sensor extracts the data from the rollover memory at the instant of polling and transmits that data to the central monitor unit. The act of extracting the information can either by used to zero the rollover memory so that each poll of the sensor produces data from the sensor relating to the number of pulses since the last poll. Alternatively the rollover memory can continue to accumulate pulses so that it rolls over on reaching the maximum or roll over number.

Using either alternative techniques, the central monitor detects the number of pulses counted since the last polling. The central monitor is arranged to provide a polling rate of the order of a few seconds and this is tailored to the size of the rollover memory and the expected number of pulses per unit time to ensure that the sensor is polled before the rollover counter goes through a full cycle of counting. Even though the rollover counter may therefore rollover, the central monitor is aware that this has occurred and can calculate the total number of pulses since the last polling by the simple calculation necessary.

A further type of sensor comprises a material level sensor for detecting the amount of material in a supply container. One example of a material level sensor is of a type in which the sensing means comprises a device which generates an ultrasonic pulse and it detects the amount of time of necessary for that pulse to reach a target and to return to the sensing means 26. This time is measured by counting a series of clock pulses so that data can be entered into the memory by the microprocessor 25 as a simple number indicative of the time period.

On polling by the central monitor, the microprocessor 25 is arranged to communicate the data from the memory 32 which is the number defining the time period to the central monitor with the central monitor effecting the calculation necessary to detect the distance of the material from the sensor and therefore the amount of material in the container.

The algorithms for effecting the calculations are stored in the memory 13 of the central monitor so that the majority of the calculation is effected by the central monitor. The individual sensors therefore include only enough processing power to effect the necessary very simple actions to put the data from the sensor into the memory generally as a simple number or as a series of pulses which are counted in the rollover memory. The microprocessor 25 again simply has enough processing power to respond to the address signals from the central monitor as previously explained in order to extract the data from the memory and to transmit it when polled to the central monitor. The majority of the calculations therefore are effected in the central monitor with the central monitor holding the information necessary to effect the calculation of ground speed, seeds per unit time, material remaining, and the units in which the display should appear, for example inches or centimeters.

The central monitor also has the ability to calculate alarm conditions and to generate alarms when required to keep the operator properly informed.

The central monitor key pad can in one example have the ability to control the monitor to provide the following display functions.

Figure 4:
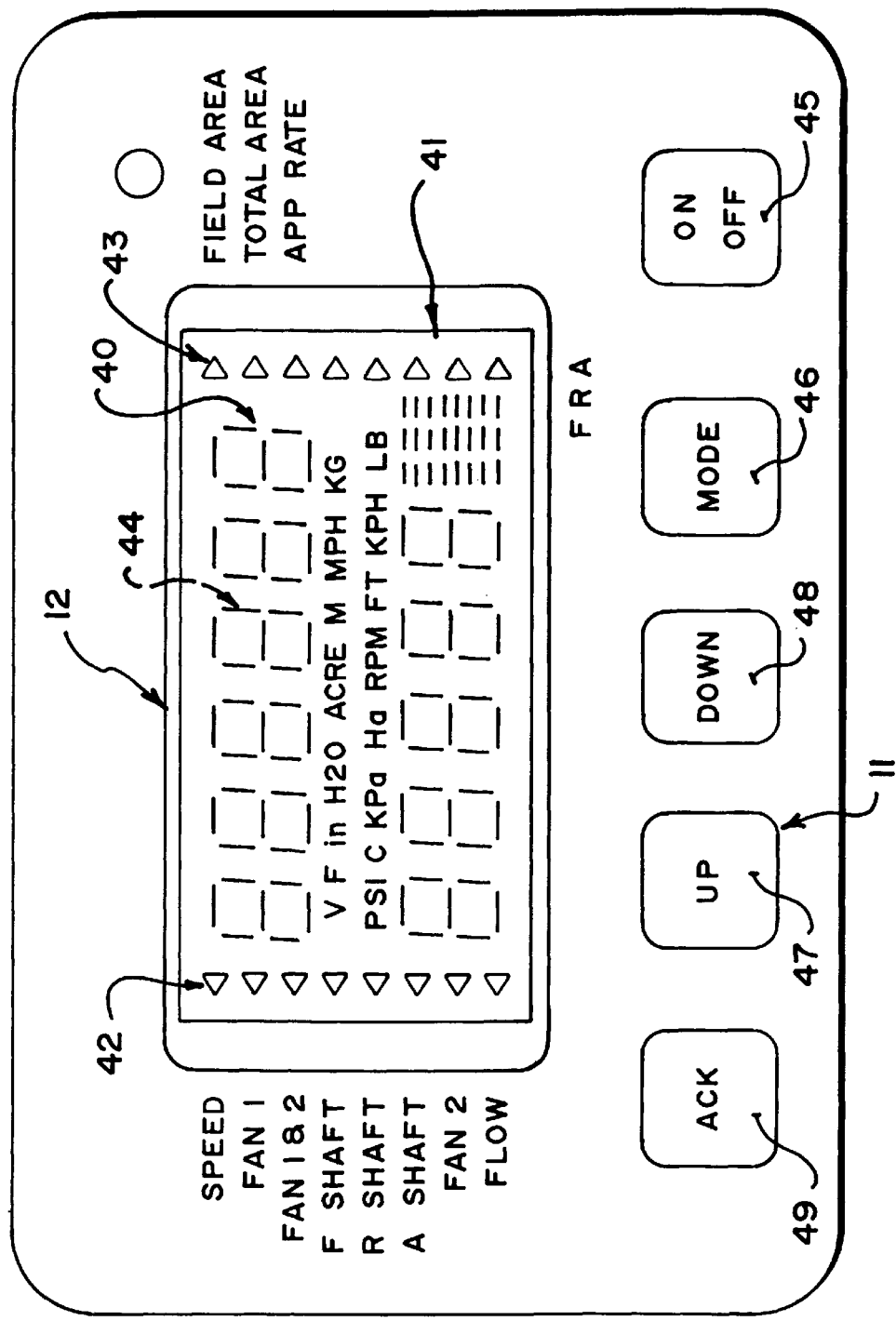
FIG. 4 is a front elevational view of the display and key pad of the central unit.

In FIG. 4 is shown a front elevational view of the display 12 and the key pad 11. The display 12 includes a first row 40 of alpha-numeric display digits and a second row 41 of numerical display digits capable of displaying words and numbers in the two separate rows. In addition the LCD display includes a number of pointers 42 indicative for example of speed, fan 1, fan 1 and 2, front shaft, rear shaft, auxiliary shaft, fan 2 and flow. A second set of pointers 43 are capable of indicating one of field area, total area and application rate. A central set of indicators 44 can indicate one of a number of different units of measure such as inches of water, acres, pounds per square inch, kilograms per hour etc.

The keypad 11 includes 5 keys including an on/off key 45, a mode select key 46, two keys 47 and 48 for scanning up and down and a fifth key 49 which acts as an acknowledge key to acknowledge a warning signal.

The mode select key can be used to select from a number of possible functions including the measurement units in which the measurements are to be displayed and also which of the elements indicated by the pointers 42 is to be selected. In addition the mode select key can be actuated to select the installation mode as described herein.

The sensor processors also are arranged to place into the sensor memory data received from the central monitor. Thus the individual sensor processors can be configured to effect different processing of the pulses or data from the sensing means.

In view of the fact that the central monitor and the individual sensors communicate on a single communication bus, it is of course necessary to configure and arrange the system so that the central monitor knows which sensor is which and can poll that sensor for the data from that sensor and at the same time is able to determine from which sensor the information is received.

The arrangement of the present invention therefore provides for each of the sensors a unique ID code as previously described which is stored in the memory system 34 as a permanent ID code assigned to and unique to that particular sensor.

In the initial installation of the system, therefore, the central monitor has an installation mode which is actuated by a key sequence on the keypad. In the installation mode, the display indicates to the operator/installer that sensor which is to be installed first. The central monitor has therefore in the memory a program which defines the order in which the sensors are to be installed. This program therefore indicates in the display the first sensor to be installed by a simple alpha-numeric display on the LCD such as "F BIN" which would be indicative of the front bin level sensor.

The central monitor during this mode repeatedly issues a global command which will be recognized by all sensors which have not previously been polled. Thus the global command provides an instruction to each sensor to transmit data including or identifying the unique ID code of the sensor. Once the sensor has acted to transmit this information in response to the global command, that sensor then remains silent and does not respond to the global command.

During the installation procedure, therefore, the central monitor provides the instruction as to which sensor should be installed next and then receives information from that sensor after it is installed as to its ID code.

The installation procedure therefore does not allow the central monitor to issue a further instruction for installation of a second sensor until after the first sensor has been installed, and until after the sensor has been polled and retransmitted its ID code for recording in the memory of the central monitor.

The central monitor therefore can correlate in the memory thereof data concerning each individual sensor, its location and function together with the ID code of that sensor.

The installation procedure is therefore continued until all of the sensors are installed. It will be appreciated that the central monitor unit is designed for use with a number of different machines and configurations of machines and therefore the sensors used and the number of sensors will vary in dependence upon the particular machine onto which the unit is to be installed. In the installation mode, therefore, the central monitor unit is arranged to provide instruction to the operator to install sensors to the maximum number to which the monitor unit can accommodate for the particular type of machine. In the event therefore that a smaller machine or different configuration of machine is involved, the operator can indicate to the central monitor unit that a particular sensor is not installed. The monitor unit therefore scrolls through the total series of sensors to be installed and the operator either installs that sensor or indicates to the monitor unit through the key pad that the particular sensor will be not be installed. On receiving information from the operator therefore that the sensor will not be installed, the installation procedure is then scrolled to the next sensor for the procedure to be repeated. After the installation is complete, the central monitor unit has stored in its memory information concerning the location and operation of each sensor together with the ID code of that sensor. During normal operation, therefore, the central monitor unit polls each sensor in a predetermined program of polling, addressing that sensor by its own ID code. The polling is therefore properly controlled by the central monitor unit so that each sensor only provides data from its storage when it is polled thus avoiding any possibility of overlap between messages from the different sensors. In order to reduce the length of the polling messages, after the installation is complete, the central monitor unit is programmed to generate an ID number for each of the sensors which is related to the location of the sensor and has a reduced number of digits so as to reduce the length of the message. In one step, therefore, after the installation is completed and at each powering up of the system, initialization of the system Includes the step of transmitting to each sensor from the central monitor unit a message or command which identifies to the sensor its ID number which is allocated to that sensor by the central monitor unit. The same initialization procedure requires that the sensor respond so as to confirm to the system that each of the sensors is up and ready for action. In the event that a sensor fails, that is the sensor fails to respond or the sensor fails to provide the necessary data when polled for that data, the central monitor unit identifies that the particular sensor is ineffective or in a fail condition and provides a display of this condition to the operator. As an alternative, the operator may choose to replace a particular sensor, for example, if he is aware that it is damaged. However this occurs, when a sensor is replaced, it will be appreciated that the central monitor unit will not, in the initialization process on power up have information concerning the ID code of that particular sensor.

In the event therefore that on initialization, the central monitor unit fails to receive a response from a particular sensor upon polling that sensor using the ID code of that sensor, at the end of the procedure, the central monitor unit issues a global command requesting any sensors which have not been polled to provide a response giving information of the ID code. The central monitor unit records the information concerning the location and function of the sensor which fails to respond and then, on receipt of a response from the globally commanded sensor, identifies that location and function with the newly responding sensor.

It is therefore possible only to replace one sensor at a time and if it is necessary to replace more than one sensor, this can only be done by repeating the installation procedure by disconnecting all of the sensors and following the installation pattern specified by the central monitor unit.

The system of the present invention therefore utilizes semi-smart sensors which include a processor and some memory. The sensors are therefore more expensive than the conventional prior art sensors which simply comprise a transducers connected individually to the central monitor unit. The system is however cost effective due to the decrease cost of harness and connectors and the ease of expansibility.

In a modified arrangement, one or more of the sensors 17, 18, 19 and 20 can comprise instead an actuator which communicates with the central unit 16 in the same manner as set forth above but instead of being used to effect sensing of a parameter, it is used to actuate operation of a machine function. Thus for example the actuator may actuate a solenoid of a clutch. Thus the system shown in FIG. 3 can include a plurality of sensors for detecting various parameters of the machine and also can include a plurality of actuators which are controlled by the central monitor 16 to actuate various components in dependence upon the sensed values. The monitor may also include means to supply data from other sources so the actuators effect actuation of the various components in dependence upon the sensed values and upon data from the outside source.

In a yet further arrangement, one of the sensors of the system shown in FIG. 3 may comprise a more complex control loop system. In one example the control loop system may control a series of depth control elements of a seeder in dependence upon sensed values generated by sensors in the control loop itself. In this complex system, therefore, the monitor would communicate with the individual sensors and possibly with some actuators and in addition would also communicate with the control device. The control device would therefore control the parameter concerned for example the depth and would effect communication of the depth to the central monitor for communication to the operator.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of monitoring operation of a machine having a plurality of parts where monitoring is required, the method comprising:

providing a plurality of transducers each arranged at a respective one of the parts of the machine to be monitored for detecting a series of events from the respective part;

causing each transducer to effect monitoring of the series of events from the respective part to generate a series of signals therefrom representative of the series of events;

providing for each transducer a respective, separate one of a plurality of sensor units such that each sensor unit is dedicated solely to a respective single one of the transducers;

each sensor unit having a sensor memory and a sensor processor for controlling input of information from the transducer into the sensor memory and for controlling getting of information from the sensor memory;

communicating the series of signals from the respective transducer to the sensor processor of its dedicated sensor unit and causing the sensor processor to store in the sensor memory of the dedicated sensor unit information related to at least two of the series of signals so that the information is representative of the series of events;

providing a central monitor unit having a visual display, manual input means, a monitor memory and a monitor processor;

providing a communication bus to which the central monitor unit and each of the plurality of sensor units are connected for communicating said information from the respective sensor memory to the central monitor unit;

causing the central monitor unit to poll on the communication bus the sensor processor of each sensor unit in turn;

causing each sensor unit when polled to effect communication of said information from the respective sensor memory through the communication bus to the central monitor unit, the information being communicated independently of that from the other sensor units and only when polled.

2. The method according to claim 1 including repeating said polling over a plurality of polling repetitions and causing the central monitor unit to receive the information from each of the sensor units for one of the plurality of polling repetitions and to collate the information with that from a previous polling repetition.

3. The method according to claim 2 including causing the sensor processor of each sensor unit to generate a count value related to the series of signals and to store the count value as the information in the respective sensor memory and causing the central monitor unit to receive the count from each of the sensor units for one of said polling repetitions and to collate the count with a count from a previous polling repetition to generate a total count over the polling repetitions.

4. The method according to claim 1 including causing the central monitor unit to generate signals for transmission on said communication bus addressed to a predetermined one of the sensor units and to include in said signals an instruction to put information into the sensor memory of the predetermined sensor unit to configure the sensor memory of the predetermined sensor unit for effecting calculation on the series of signals from the transducer of the predetermined sensor unit.

5. The method according to claim 1 wherein at least one of the sensor units is arranged for detection of a speed of rotation of a machine component to be monitored and includes switch means responsive to passage thereby of a switch element mounted on the component such that rotation of the component causes the switch element to repeatedly pass the switch means to actuate the switch means to generate said series of signals and wherein the sensor processor is arranged to input into the sensor memory data related to the period of time between a last signal and a penultimate signal.

6. The method according to claim 5 wherein the sensor processor is arranged to input into the sensor memory data relating to the time period since the last signal if that time period is greater than the time period between the last signal and the penultimate signal.

7. A method of monitoring operation of a machine having a plurality of parts where monitoring is required, the method comprising:

providing a plurality of transducers each arranged at a respective one of the parts of the machine to be monitored for detecting information from the respective part;

providing for each transducer a respective, separate one of a plurality of sensor units such that each sensor unit is dedicated solely to a respective single one of the transducers;

each sensor unit having a sensor memory and a sensor processor for controlling input of information from the transducer into the sensor memory and for controlling getting of information from the sensor memory;

providing a central monitor unit having a visual display, manual input means, a monitor memory and a monitor processor;

providing a communication bus to which the central monitor unit and each of the plurality of sensor units are connected for communicating information from the respective sensor memory to the central monitor unit;

providing in each sensor unit a unique ID code;

at installation:

providing instructions to an operator for installation of the sensor units in a particular order such that each sensor unit installed is associated with a particular location in the order;

causing the central monitor unit to poll each installed sensor unit after installation thereof to obtain therefrom the ID code identifying the installed sensor unit;

and causing the central monitor unit to record the obtained ID code in association with the particular location in the order to identify the sensor unit at each location in turn;

and after installation:

causing the transducers to effect monitoring of the respective parts to generate data therefrom;

communicating the data from the respective transducer to the sensor processor of its dedicated sensor unit and storing information from the sensor processor related to the data in the sensor memory of the dedicated sensor unit;

and causing the sensor processor of each identified sensor unit to effect communication of said information from the respective sensor memory through the communication bus to the central monitor unit, independently of the other sensor units.

8. The method according to claim 7 including causing the central monitor unit to provide the instructions to the operator.

9. The method according to claim 7 including causing the central monitor unit to poll the sensor units one at a time on the communication bus for getting said information from the sensor memory of each sensor unit when polled, the sensor units being arranged to provide said information only when polled.

10. The method according to claim 7 including causing the central monitor unit to generate a signal defining an ID number for each sensor unit, which ID number is different from the ID code and to communicate said ID number to the respective sensor unit, and causing the respective sensor unit to store the ID number so that it is responsive to the ID number.

11. The method according to claim 7 including, after installation:

causing the central monitor unit to poll the sensor units one at a time on the communication bus;

causing the central monitor unit, on failing to receive a response from a particular one of the sensor units, to store information concerning the particular location in the order of the particular one of the sensor units;

and subsequently causing the central monitor unit to issue a signal on the communication bus requiring any sensor unit which has not been polled to provide a reply signal indicating its ID code; and, on receipt of the ID code by the central monitor unit, causing the central monitor unit to store the ID code in conjunction with said information concerning the particular location in the order of the particular one of the sensor units.

12. A method of monitoring operation of a machine having a plurality of parts where monitoring is required, the method comprising:

providing a plurality of transducers each arranged at a respective one of the parts of the machine to be monitored for detecting information from the respective part;

providing for each transducer a respective, separate one of a plurality of sensor units such that each sensor unit is dedicated solely to a respective single one of the transducers;

each sensor unit having a sensor memory and a sensor processor for controlling input of information from the transducer into the sensor memory and for controlling getting of information from the sensor memory;

providing a central monitor unit having a visual display, manual input means, a monitor memory and a monitor processor;

providing a communication bus to which the central monitor unit and each of the plurality of sensor units are connected for communicating said information from the respective sensor memory to the central monitor unit;

providing in each sensor unit a unique ID code;

causing the central monitor unit to poll the sensor units one at a time on the communication bus using, for addressing each sensor unit, its ID code;

in the event that one of the sensor units fails to respond, causing the central monitor unit to transmit a signal which is instructive of any sensor unit which has not been addressed by the central monitor unit to respond and to provide its ID code such that the central monitor unit obtains the ID code of a sensor unit which has replaced a faulty sensor unit.

13. A monitoring apparatus for a seed planter comprising:

a central monitor unit having a visual display, manual input means, a monitor memory and a monitor processor;

a plurality of seed sensor units, each for detecting passage of seeds through a respective one of a plurality of seed paths of the seed planter;

and a communication bus to which each of the plurality of seed sensor units is connected for communicating information to the central monitor unit;

each of said seed sensor units including a transducer for disposition adjacent the seed path for generating a series of signals in response to the passage of seeds along the path, a sensor processor for receiving said series of signals from the transducer and a sensor memory;

the plurality of seed sensor units being arranged such that each transducer of the plurality of seed sensor units is associated with its own sensor memory and its own sensor processor such that each sensor processor and the respective sensor memory is dedicated solely to a respective single transducer;

the plurality of seed sensor units being arranged such that each sensor processor receives the series of signals from the respective transducer and controls input during a time period into the respective sensor memory of a count value relating to a number of seeds passing the transducer in the period;

the central monitor unit being arranged to poll on the communication bus the sensor processor of each sensor unit in turn;

and the sensor units being arranged to effect communication of said count value from the respective sensor memory through the communication bus to the central monitor unit independently of that from the other sensor units and only when polled.

14. The apparatus according to claim 13 wherein the central monitor unit is arranged to repeat said polling over a plurality of polling repetitions and wherein the central monitor unit is arranged to receive the count from each of the sensor units for one of said polling repetitions and to collate the count with a count from a previous polling repetition to generate a total count over the polling repetitions.

15. The apparatus according to claim 13 wherein the central monitor unit is arranged to generate signals for transmission on said communication bus addressed to a predetermined one of the sensor units and to include in said signals an instruction to put information into the sensor memory of the predetermined sensor unit to configure the sensor memory of the predetermined sensor unit for effecting calculation on the series of signals from the transducer of the predetermined sensor unit.

16. The apparatus according to claim 13 wherein there is provided at least one speed sensor unit which is arranged for detection of a speed of rotation of a machine component to be monitored including a transducer which comprises switch means responsive to passage thereby of a switch element mounted on the component such that rotation of the component causes the switch element to repeatedly pass the switch means to actuate the switch means and including a sensor processor which is arranged to input into the sensor memory data related to the period of time between a last actuation of the switch element and a penultimate actuation of the switch element.

17. The apparatus according to claim 16 wherein the sensor processor of the speed sensor is arranged to input into the sensor memory of the speed sensor data relating to the time period since the last actuation if that time period is greater than the time period between the last actuation and the penultimate actuation.

18. The apparatus according to claim 13 wherein:

each sensor unit has a unique ID code;

the central monitor unit is arranged to provide instructions to an operator for installation of the sensor units in a particular order such that each sensor unit installed is associated with a particular location in the order;

the central monitor unit is arranged to poll each installed sensor unit after installation thereof to obtain therefrom the ID code identifying the installed sensor unit;

the central monitor unit is arranged to record the obtained ID code in association with the particular location in the order to identify the sensor unit at each location in turn.

19. The apparatus according to claim 18 wherein the central monitor unit is arranged to generate a signal defining an ID number for each sensor unit, which ID number is different from the ID code and to communicate said ID number to the respective sensor unit, and wherein the respective sensor unit is arranged to store the ID number so that it is responsive to the ID number.

20. The apparatus according to claim 18 wherein the central monitor unit is arranged, after installation, to poll the sensor units one at a time on the communication bus; on failing to receive a response from a particular one of the sensor units, to store information concerning the particular location in the order of the particular one of the sensor units; subsequently to issue a signal on the communication bus requiring any sensor unit which has not been polled to provide a reply signal indicating its ID code; and, on receipt of the ID code by the central monitor unit, to store the ID code in conjunction with said information concerning the particular location in the order of the particular one of the sensor units.

21. The apparatus according to claim 13 wherein each sensor unit has a unique ID code;

the central monitor unit is arranged to poll the sensor units one at a time on the communication bus using, for addressing each sensor unit, its ID code;

the central monitor unit is arranged, in the event that one of the sensor units fails to respond, to transmit a signal which is instructive of any sensor unit which has not been addressed by the central monitor unit to respond and to provide its ID code such that the central monitor unit obtains the ID code of a sensor unit which has replaced a faulty sensor unit.

* * * * *